United States Patent [19]
Wiggs

[11] Patent Number: 5,623,986
[45] Date of Patent: Apr. 29, 1997

[54] ADVANCED IN-GROUND/IN-WATER HEAT EXCHANGE UNIT

[76] Inventor: B. Ryland Wiggs, 425 Sims La., Franklin, Tenn. 37064

[21] Appl. No.: 530,053

[22] Filed: Sep. 19, 1995

[51] Int. Cl.⁶ ............................................. F28D 21/00
[52] U.S. Cl. ............................. 165/45; 165/163; 165/184; 62/260
[58] Field of Search ..................... 165/45, 163, 177, 165/184; 62/260; 60/641.2

[56] References Cited

U.S. PATENT DOCUMENTS

| | | | |
|---|---|---|---|
| 2,203,881 | 6/1940 | Schwab et al. | 165/45 X |
| 3,062,289 | 11/1962 | Eades | 165/45 X |
| 3,183,675 | 5/1965 | Schroeder | 165/45 X |
| 4,328,858 | 5/1982 | Richter et al. | 165/45 |
| 4,516,629 | 5/1985 | Bingham | 165/45 |
| 4,741,388 | 5/1988 | Kuroiwa | 165/45 |

FOREIGN PATENT DOCUMENTS

| | | | |
|---|---|---|---|
| 3026638 | 2/1982 | Germany | 165/45 |
| 3149636 | 7/1983 | Germany | 165/45 |
| 3422806 | 1/1986 | Germany | 165/163 |
| 66062 | 4/1985 | Japan | 165/45 |
| 123951 | 5/1989 | Japan | 165/45 |
| 24948 | of 1904 | United Kingdom | 62/260 |

Primary Examiner—Leonard R. Leo
Attorney, Agent, or Firm—Sanford J. Piltch

[57] ABSTRACT

A geothermal heat exchange unit, which can be placed in ground or in water, having a hollow sleeve about which a helical winding of thermally conductive tubing is wound and a return length of thermally conductive tubing along the central axis of the sleeve separated from the inner wall of the sleeve by thermal insulating material. The heat exchange unit may be housed within a thermally conductive case with a thermally conductive material filling the gap between the inner wall of the case and the thermally conductive tubing surrounding the sleeve of the heat exchange unit. The thermally conductive case may have at least one set of helical fins which act as threads for ground insertion assistance. The heat exchange units may be combined to form greater lengths and be combined in series or parallel connection for greater efficiency.

30 Claims, 2 Drawing Sheets

ADVANCED IN-GROUND/IN-WATER HEAT EXCHANGE UNIT

FIELD OF THE INVENTION

The present invention relates to an in-ground/in-water heat exchange unit for use in association with any heating/cooling system and/or power generation system utilizing in-ground and/or in water heat exchange elements as a primary or supplemental source of heat transfer.

BACKGROUND OF THE INVENTION

Ground source/water source heat exchange heating/cooling systems typically utilized closed loops of tubing buried in the ground or placed in water, such as a lake. These closed loops may be installed in a variety of manners, including horizontal configurations or helical loops, as well as in vertical configurations typically consisting of elongated U-shaped tubes placed into holes drilled into the earth. These heat exchange loops may carry a water/anti-freeze mixture in a water source system, or a refrigerant in a direct exchange system.

While all such ground source heat exchange designs work relatively well, there are four common disadvantages. The first is that either extensive excavation or expensive well drilling is necessary. The second is that achieving good compaction and heat transfer in the excavated ground is difficult and expensive, often requiring detailed and extensive grouting when wells are employed. The third disadvantage, particularly common in closed loop well installations, is that the water or refrigerant or other heat exchange fluid, once it has either acquired or rejected heat as it travels deep into the well, must return in close proximity to the opposite respective cold or hot entering tube, which imposes a negative impact on the most efficient heat exchange achieved during the heat exchange fluid's deepest geothermal or submersion transit. The fourth disadvantage is that the contact surface area of the tubes carrying the heat exchange fluid is typically rather small, especially in direct expansion systems.

While various designs, such as that disclosed by U.S. Pat. No. 5,261,251 [Galiyano] and U.S. Pat. No. 5,054,541 [Tripp], help reduce land area requirements, they still require excavation and are still subject to the other disadvantages noted above.

Consequently, it is an object of the present invention to provide a geothermal heat exchange unit, which can be placed in ground or in water, which is relatively inexpensive to install, without the need for extensive excavation, and which instantly achieves good ground compaction without the necessity of grouting or other special fill.

It is also an object of the present invention to insulate the returning heat exchange tube from the adverse thermal effects of the entering heat exchange tube which, in turn, significantly increases the surface area of heat exchange contact with the natural surrounding earth or water without adverse heating or cooling effects between the tubes.

Further, the present invention provides a relatively inexpensive and efficient means of primarily providing and/or of supplementing the heating/cooling work accomplished via any heating/cooling system, such as a hydronic or an air-to-air heat pump system.

SUMMARY OF THE INVENTION

In accordance with the invention, the advanced in-ground/in-water heat exchange unit comprises a hollow sleeve having a helical winding of thermally conductive tubing around its outer wall and a return length of thermally conductive tubing along the central axis of the sleeve separated from the inner wall of the sleeve by thermally insulating material. The geothermal heat exchange unit may be housed within a thermally conductive case having a pointed or sharpened bottom tip (or a flat or rounded bottom), with a thermally conductive material filling the gap between the inner wall of the case and the thermally conductive tubing surrounding the sleeve of the heat exchange unit. The thermally conductive case may have at least one set of helical fins which act as threads for ground insertion assistance.

The geothermal heat exchange unit is of a defined length and may form a geothermal heat exchange segment which is attachable to a companion geothermal heat exchange segment to form a combination geothermal heat exchange unit having plural segments which extends the overall length of said geothermal heat exchange unit.

The geothermal heat exchange unit may be connected in series or in parallel to other geothermal heat exchange units by common supply and return fluid lines. This may be accomplished with each respective geothermal heat exchange unit (with or without the external case) regardless of any number of attached companion segments which are connected in either series or in parallel to other geothermal heat exchange units, again regardless of the number of attached companion segments. Further, the heat exchange units can be single segments, or can consist of more than one companion segment which can be pieced together at a job site if extended lengths for increased depths are desired.

Whether the geothermal heat exchange unit is installed in ground or in water the optional thermally conductive case will contain a thermally conductive material filling the gap between the exterior of the hollow sleeve and the inner wall of the case, completely surrounding and covering the helically would thermally conductive tubing.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
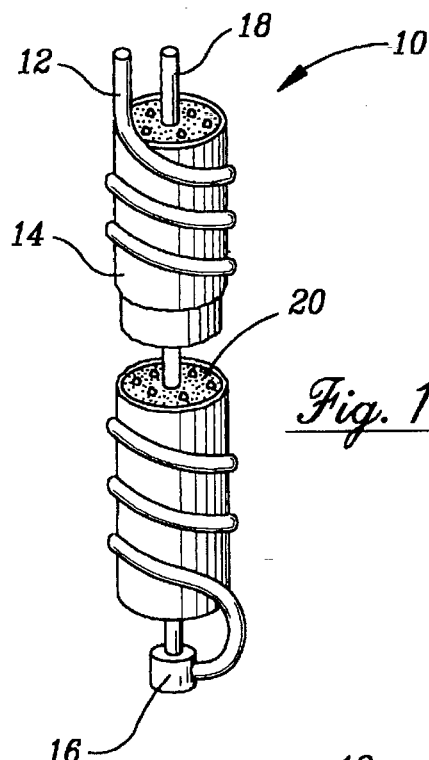
FIG. 1 is an isometric view of the tubing system to be placed in geothermal contact with either the ground or ground water of the present invention partially cut-away to show the central tube and the insulation placed between the central tube and the outer tube.

Referring now to the drawings in detail, where like numerals refer to like parts or elements, there is shown in FIG. 1 the basic advanced heat exchange unit 10 of the present invention. An entering thermally conductive tube 12 is helically would around the outside of a hollow sleeve 14, which sleeve may be a plastic pipe or some other type of hollow tube having a cylindrical shape or configuration. The thermally conductive tubing 12 traverses to the bottom of the sleeve 14 terminating in an optional coupling 16. The optional coupling 16 connects the entering tube 12 and the return tube 18.

The optional coupling 16 remains in place for a single heat exchange unit connecting the entering and return tubes 12 and 18, but may be disconnected for attaching extension lengths of the heat exchange units 10 in a stacked array. This modification will require the joining of the entering tube 12 to the respective entering tube of the extension heat exchange unit and the joining of the respective return tube 18 of the extension heat exchange unit when a plurality of heat exchange units 10 are connected with companion segments for added depth or length. At the bottom of the lowermost heat exchange unit 10, the coupling 16 can remain in place connecting the entering and return tubes 12, 18, or may be entirely eliminated at the lowermost heat exchange unit 10.

The return tube 18 traverses a path along the central axis of the sleeve 14 exiting the sleeve at a point adjacent the point where the entering tube 12 begins to wrap around the sleeve 14. Separating the entering and return tubes 12, 18 is an insulating material 20, which may be comprised of foam, rubatex or other insulating material and which fills the interior cavity of the sleeve 14 surrounding the thermally conductive return tube 18 to provide an environment which thermally insulates the entering tube 12 from the return tube 18. In turn, this results in the thermal isolation of each tube from the other which creates a local environment in which the heat content (or lack thereof) in either tube will have little or no effect on the other tube.

Figure 2:
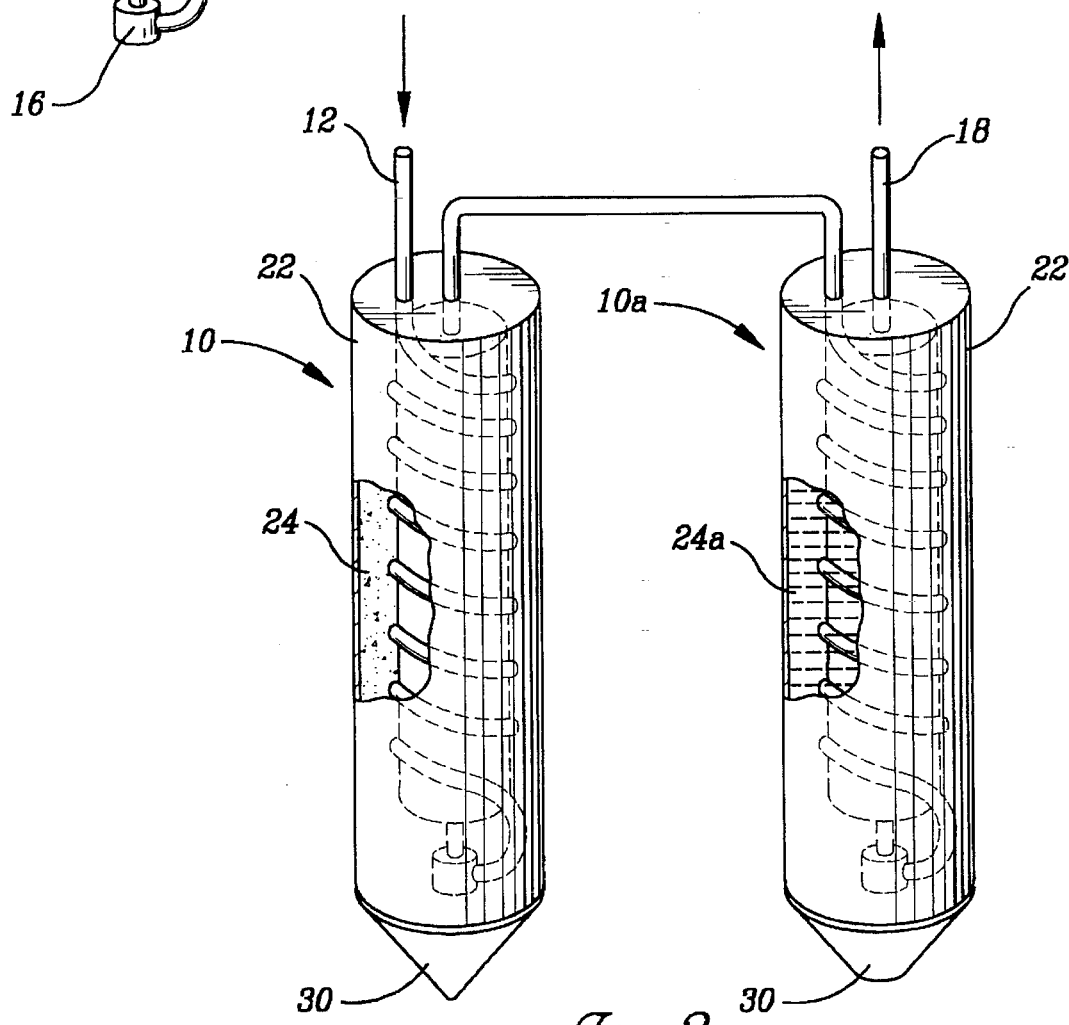
FIG. 2 is an isometric view of the tubing system of the present invention placed within a cartridge having a thermally conductive exterior wall partially cut-away to show the insulating material placed between the tubing system and the outer wall of the cartridge and to show a series tubing connection of a plurality of such cartridges.

Referring now to FIG. 2, a series of heat exchange units 10 is shown. Each of the heat exchange units 10 are placed within a thermally conductive encasement 22. Such cases 22 may be utilized whenever additional thermally conductive surface area is desirable or whenever it is desirable to provide a hard protective shell around the heat exchange unit 10. The case 22 may also be used to protect the heat exchange unit 10 from possible damage whenever it is more desirable to push the heat exchange unit directly into the ground rather than excavate for placement.

When the thermally conductive encasement 22 is utilized, a thermally conductive fill material 24, such as powdered metal or stone, or concrete, is utilized to fill the void surrounding the thermally conductive tubing 12 between the outer expanse of the heat exchange unit 10 and the inner wall of the thermally conductive case 22 to promote the heat exchange between the heat exchange unit 10 and the ground or liquid into which it is placed. It is also possible to fill the void surrounding the heat exchange unit 10 with a liquid or a gel 24a, e.g. water and anti-freeze mixture.

Figure 3:
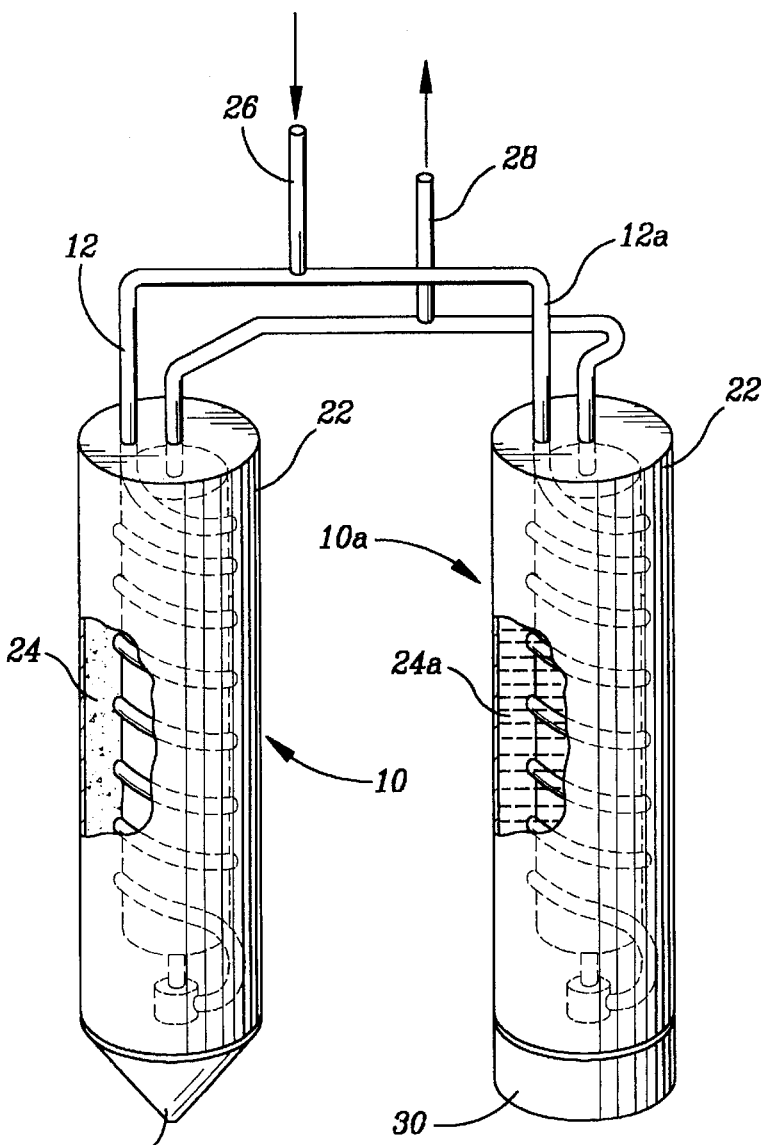
FIG. 3 is an isometric view of the tubing system of the present invention placed within a cartridge having a thermally conductive exterior wall partially cut-away to show the insulating material placed between the tubing system and the outer wall of the cartridge and to show a parallel tubing connection of a plurality of such cartridges.

The series of heat exchange units 10 shown in FIG. 3 are connected in series with the return tube 18 of heat exchange unit 10 connected to the entering tube 12 of heat exchange unit 10a. In this manner the heat exchange fluid flowing in the tubes 12, 18 can traverse a number of heat exchange units to be heated or cooled as desired. The heat exchange fluid will exit from the final heat exchange unit 10 in the series and return to the heating/cooling system. Although only two such units are shown, it is contemplated that a greater number of units can be connected as described to quicken the heat exchange process and make it more efficient.

With reference to FIG. 3 there is shown a series of heat exchange units 10 of the present invention housed within thermally conductive cases 22 with similar fill material 24, 24a. However, the configuration of the connection between the heat exchange units 10, 10a is a parallel connection which permits the heat exchange fluid to enter through inlet tube 26 and flow simultaneously through entering tubes 12, 12a of the heat exchange units 10, 10a. After traversing each heat exchange unit the heat exchange fluid returns to the heating/cooling system through return tubes 18, 18a and exit tube 28. Although only two heat exchange units are shown, it is contemplated that a greater number of such units can be utilized to effect a faster and more efficient heat exchange between the heat exchange fluid and the geological material into which each unit is placed.

When utilizing the thermally conductive case 22, there is provided a connecting device 30 which may be threadedly connected to the lowermost end of the case 22. The connecting device or cover 30 can be used merely as a bottom seal as in FIG. 3 on heat exchange unit 10a where the cover 30 is shaped and dimensioned to exactly match the dimensions of the case 22. The cover 30 may also be configured to assist in the placement of the case 22 in the ground as in FIG. 2 on heat exchange unit 10 where the cover is shaped and dimensioned as an inverted cone. An additional contemplated shape is the inverted truncated cone of FIG. 2 heat exchange unit 10a which may be used to provide stability in certain geological conditions, e.g. extremely soft underground conditions, to prevent sinking of the installation below acceptable distances from the surface. Of course, the flat bottom surface of the cover 30 may also be utilized to prevent the displacement of the heat exchange unit 10 by sinking.

Since the case 22 has a connecting cover 30 at its bottom, additional companion heat exchange units 10 can be attached by removing the cover 30 and attaching a case extension when deeper and longer extensions of the heat exchange units are desirable. The cover 30 can be reattached to the lower case 22 to close off the interior of the case as described above. Rather than the flat cover 30 of FIG. 3 heat exchange unit 10a, the pointed tip cover 30 of FIG. 2 heat exchange unit 10 can be attached to the lower end of the case 22 to aid in pushing the heat exchange unit 10 and case 22 into the ground.

Figure 4:
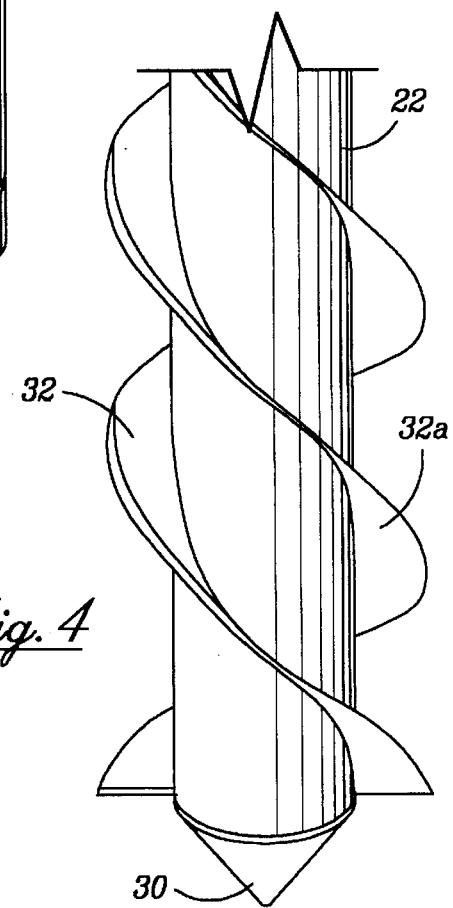
FIG. 4 is an external plan view of the cartridge with optional spiral fins for ground insertion of the cartridge.

FIG. 4 shows an exterior of the thermally conductive case 22 modified to include two sets of helical fins 32, 32a. These fins 32, 32a act as screw threads to assist in the inserting of the heat exchange unit 10 into various geological locations, e.g. sand, soil or loose rock, by turning the unit into the ground in a screw-like manner.

In accordance with the foregoing description the heat exchange unit 10 may be utilized singly, in combination with another such unit to extend the depth of the combined heat exchange unit, in series connection with another such unit, or in parallel connection with another such unit. The heat exchange unit 10 may be utilized without the case 22 or with the case 22 and the thermally conductive gap filling material to enhance the heat exchange capabilities of the cased heat exchange unit. Of course, the cased heat exchange unit can be utilized in all of the described circumstances as could the uncased heat exchange unit.

The present invention accomplishes all the stated objectives by requiring either none, or only minimal, excavation. For example, the heat exchange units can either simply be pushed by a backhoe, pile driver or other means, directly into the ground or water, at any angle, or can be fitted with spiral fins and drilled directly into the virgin earth. This will result in additional compression of the virgin earth directly adjacent to the case, which will enhance thermal conductivity from the start absent any requirement for artificial fill, grouting, or artificially inducing settlement of a typically excavated area.

In installations in a liquid geothermal material environment, the thermally conductive case 22 will protect the thermally conductive tubing 12 from fish hooks, boat motors and other potential puncture hazards. In ground installations, the thermally conductive case 22 will protect against rock damage to the thermally conductive tubing 12 during installation, and will provide an extra safety encasement for any leak in a water source geothermal heating and cooling system utilizing a potentially hazardous anti-freeze mixture.

Further, the present invention insulates the returning line carrying the heat exchange fluid the entire distance from the maximum effective thermal exchange point in the ground, as well as provides an enhanced and more uniform exterior surface heat exchange area, effected via the thermally conductive case 22 which is much larger than the surface area of the thermally conductive tubing alone.

The heat exchange unit 10 can also be utilized to enhance operational efficiencies of a mechanical and an electrical power generation system, as described in U.S. Pat. No. 5,272,879 [Wiggs]. The heat exchange unit 10 can be pre-assembled at a manufacturing plant and easily shipped to a job site for installation. The heat exchange unit 10 of the present invention can also be installed and connected to conventional hydronic or air to air heat pump systems so as to supplement and enhance the efficiencies of those conventional systems.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A geothermal heat exchange unit comprising a hollow sleeve having inner and outer walls about central axis, a helical winding of thermally conductive tubing around the outer wall and a return length of said thermally conductive tubing along the central axis of the sleeve separated from the inner wall of the sleeve by thermally insulating material.

2. The geothermal heat exchange unit of claim 1, wherein said heat exchange unit is housed within a thermally conductive case having a closed bottom end, with a thermally conductive material filling a gap between an inner wall of the case and the thermally conductive tubing surrounding the sleeve of the heat exchange unit.

3. The geothermal heat exchange unit of claim 2, wherein said thermally conductive case has at least one set of helical fins which act as threads for ground insertion assistance.

4. The geothermal heat exchange unit of claim 2, wherein said geothermal heat exchange unit being of a defined overall length forms a geothermal heat exchange segment and is attachable to a companion geothermal heat exchange segment of a defined overall length to form a combination geothermal heat exchange unit having plural segments extending the overall length of said geothermal heat exchange unit.

5. The geothermal heat exchange unit of claim 4, wherein each respective geothermal heat exchange unit, regardless of the number of attached companion segments, can be connected in parallel to other geothermal heat exchange units, regardless of the number of attached companion segments, by common supply and return fluid lines.

6. The geothermal heat exchange unit of claim 5, wherein each respective geothermal heat exchange unit, regardless of the number of attached companion segments, can be utilized for mechanical and electrical power production.

7. The geothermal heat exchange unit of claim 5, wherein each respective geothermal heat exchange unit, regardless of the number of attached companion segments, can be utilized to heat or chill water for a hydronic heating or cooling application.

8. The geothermal heat exchange unit of claim 5, wherein each respective geothermal heat exchange unit, regardless of the number of attached companion segments, can be utilized to enhance the efficiency of an air to air heat pump.

9. The geothermal heat exchange unit of claim 4, wherein each respective geothermal heat exchange unit, regardless of the number of attached companion segments, can be connected in series to other geothermal heat exchange units, regardless of the number of attached companion segments, by common supply and return fluid lines.

10. The geothermal heat exchange unit of claim 9, wherein each respective geothermal heat exchange unit, regardless of the number of attached companion segments, can be utilized for mechanical and electrical power production.

11. The geothermal heat exchange unit of claim 9, wherein each respective geothermal heat exchange unit, regardless of the number of attached companion segments, can be utilized to heat or chill water for a hydronic heating or cooling application.

12. The geothermal heat exchange unit of claim 9, wherein each respective geothermal heat exchange unit, regardless of the number of attached companion segments, can be utilized to enhance the efficiency of an air to air heat pump.

13. The geothermal heat exchange unit of claim 2, wherein said closed bottom end of said thermally conductive case being configured in accordance with one shape from the group of shapes consisting essentially of flat, hemispherical, inverted conical, or truncated inverted conical.

14. The geothermal heat exchange unit of claim 1, wherein said geothermal heat exchange unit being of a defined overall length forms a geothermal heat exchange segment and is attachable to a companion geothermal heat exchange segment of a defined overall length to form a combination geothermal heat exchange unit having plural segments extending the overall length of said geothermal heat exchange unit.

15. The geothermal heat exchange unit of claim 14, wherein each respective geothermal heat exchange unit, regardless of the number of attached companion segments, can be connected in parallel to other geothermal heat exchange units, regardless of the number of attached companion segments, by common supply and return fluid lines.

16. The geothermal heat exchange unit of claim 15, wherein each respective geothermal heat exchange unit, regardless of the number of attached companion segments, can be utilized for mechanical and electrical power production.

17. The geothermal heat exchange unit of claim 15, wherein each respective geothermal heat exchange unit, regardless of the number of attached companion segments, can be utilized to heat or chill water for a hydronic heating or cooling application.

18. The geothermal heat exchange unit of claim 15, wherein each respective geothermal heat exchange unit, regardless of the number of attached companion segments, can be utilized to enhance the efficiency of an air to air heat pump.

19. The geothermal heat exchange unit of claim 14, wherein each respective geothermal heat exchange unit, regardless of the number of attached companion segments, can be connected in series to other geothermal heat exchange units, regardless of the number of attached companion segments, by common supply and return fluid lines.

20. The geothermal heat exchange unit of claim 19, wherein each respective geothermal heat exchange unit, regardless of the number of attached companion segments, can be utilized for mechanical and electrical power production.

21. The geothermal heat exchange unit of claim 19, wherein each respective geothermal heat exchange unit, regardless of the number of attached companion segments, can be utilized to heat or chill water for a hydronic heating or cooling application.

22. The geothermal heat exchange unit of claim 19, wherein each respective geothermal heat exchange unit, regardless of the number of attached companion segments, can be utilized to enhance the efficiency of an air to air heat pump.

23. The geothermal heat exchange unit of claim 1, wherein said geothermal heat exchange unit can be connected in parallel to other geothermal heat exchange units by common supply and return fluid lines.

24. The geothermal heat exchange unit of claim 23, wherein each respective geothermal heat exchange unit can be utilized for mechanical and electrical power production.

25. The geothermal heat exchange unit of claim 23, wherein said respective geothermal heat exchange unit can be utilized to heat or chill water for a hydronic heating or cooling application.

26. The geothermal heat exchange unit of claim 23, wherein said respective geothermal heat exchange unit can be utilized to enhance the efficiency of an air to air heat pump.

27. The geothermal heat exchange unit of claim 1, wherein said geothermal heat exchange unit can be connected in series to other geothermal heat exchange units by common supply and return fluid lines.

28. The geothermal heat exchange unit of claim 27, wherein each respective geothermal heat exchange unit can be utilized for mechanical and electrical power production.

29. The geothermal heat exchange unit of claim 27, wherein said respective geothermal heat exchange unit can be utilized to heat or chill water for a hydronic heating or cooling application.

30. The geothermal heat exchange unit of claim 27, wherein said respective geothermal heat exchange unit can be utilized to enhance the efficiency of an air to air heat pump.

* * * * *